No. 724,510. PATENTED APR. 7, 1903.
A. SCHÜTT.
STUFFING BOX FOR FLEXIBLE STEAM OR GAS TURBINE SHAFTS.
APPLICATION FILED APR. 12, 1902.
NO MODEL.
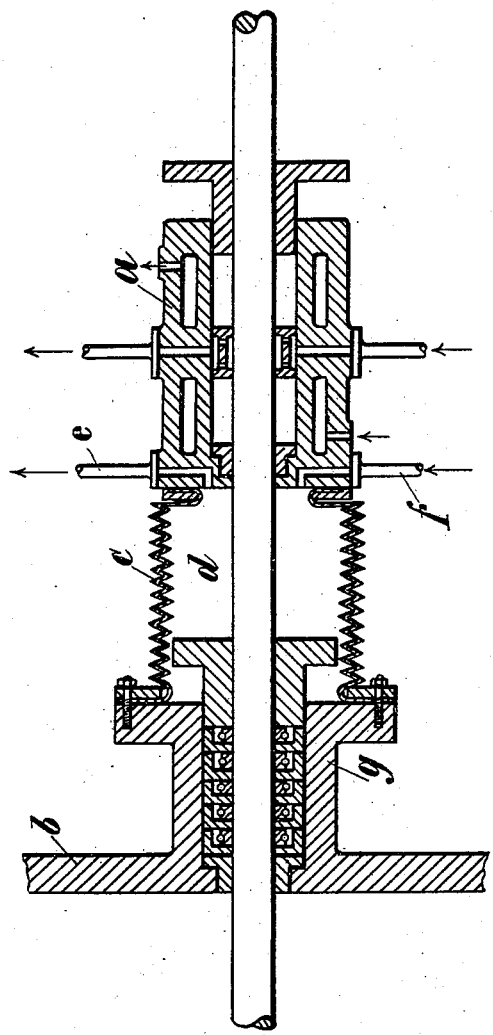
WITNESSES:
INVENTOR
ALFRED SCHÜTT
BY
ATTORNEYS

UNITED STATES PATENT OFFICE.

ALFRED SCHÜTT, OF CHARLOTTENBURG, GERMANY.

STUFFING-BOX FOR FLEXIBLE STEAM OR GAS TURBINE SHAFTS.

SPECIFICATION forming part of Letters Patent No. 724,510, dated April 7, 1903.

Application filed April 12, 1902. Serial No. 102,577. (No model.)

*To all whom it may concern:*

Be it known that I, ALFRED SCHÜTT, mechanical engineer, a subject of the Emperor of Germany, and a resident of No. 19 Pestalozzi street, Charlottenburg, in the Kingdom of Prussia and Empire of Germany, have invented certain new and useful Improvements in Stuffing-Boxes for Flexible Steam or Gas Turbine Shafts, of which the following is a specification.

The present invention relates to a resilient stuffing-box for flexible steam and gas turbine shafts. In most steam or gas turbine plants the shaft inside the turbine-case is of so reduced a diameter that when running it takes a curved shape and that the center of gravity of the working wheel falls into the axis of rotation. Now the stuffing-box located at the outlet of the turbine-case and designed for packing the shaft will hardly do this properly on account of the curved shape of said shaft. A gas-tight packing is particularly difficult to obtain with such turbines as are driven by vapors of liquids of low boiling-point, because the cold vapors arising from those liquids are adapted to penetrate any kind of packing material without counting that the condenser-pressure of such gases generally lies several pounds per square inch above the atmospheric pressure. Furthermore, it ought to be taken into account that even the smallest leakage may give cause to considerable annoyance, because those vapors often have a bad smell or are injurious to health. This drawback is, as everybody knows, obviated through a long stuffing-box of a particular construction; but this is attained only in those cases where the shaft remains straight inside the stuffing-box. With curved shafts such stuffing-boxes cannot possibly prevent leakage, because the packing cannot follow the shaft in its different deflections.

In the present specification I describe a perfectly tight stuffing-box for steam and gas turbines characterized through its being divided into two parts elastically linked together in its center, by which means it is attained that the stuffing-box becomes resilient and adapted to closely follow all movements of the shaft.

In the accompanying drawing a form of execution of this mechanism is illustrated.

The shaft, which may be journaled inside or outside the turbine-casing, emerges from the latter through the stuffing-collar $g$, strongly and tightly affixed to said casing and lined, for instance, with the well-known so-called "movable" metal packing. The stuffing-box half or collar $g$ is connected to the other collar $a$ by an elastic connection, preferably in the nature of a corrugated sleeve $c$, such arrangement permitting the collar $a$, in spite of its being steam-tight united to the other collar $g$, to follow independently of the latter any lateral movement of the shaft, insuring thereby its unvaried concentrical running in the collar $a$ of the stuffing-box, which, as is well known, is the first requirement for attaining a reliable working of the stuffing-box.

The space $d$, contained between the two halves $a$ and $g$ of the stuffing-box and inclosed by the elastic connection or sleeve $c$, plays in my case the part of the known hollow space which stands under low pressure, for which purpose it is connected to the condenser of the engine by means of the two tubes $e$ and $f$.

What I claim as my invention, and want to secure by Letters Patent, is—

1. The combination, with a flexible continuous rotary shaft, of a rigid stuffing-box section surrounding a portion of said shaft, another stuffing-box section surrounding a different portion of the shaft and engaging the same, said second section being carried by the shaft and freely movable therewith so as to follow the shaft in its lateral deviations without material resistance, and a flexible connection extending from one stuffing-box section to the other.

2. The combination with a flexible continuous rotary shaft, of a rigid stuffing-box section surrounding and engaging the inner portion of said shaft, another stuffing-box section surrounding and engaging the outer portion of the shaft, said second section being carried by the shaft and freely movable therewith, so as to follow the shaft in its lateral deviations without material resistance, and an elastic sleeve extending from one stuffing-box section to the other.

3. The combination with a flexible continuous rotary shaft, of a rigid stuffing-box section engaging and surrounding one portion of said shaft, another stuffing-box section surrounding and engaging a different portion of the shaft, said second section being carried by the shaft and freely movable therewith to follow the shaft in its lateral deviations without material resistance, and an elastic connection consisting of a corrugated sleeve extending from one stuffing-box section to the other.

4. The combination, with a flexible shaft, of a fixed stuffing-box section surrounding and engaging a portion of said shaft, another stuffing-box section surrounding and engaging a different portion of said shaft, said second section being movable so as to follow the shaft in its lateral deviations, a tubular flexible connection extending from one stuffing-box section to the other, and a tube or channel leading into the space surrounded by said tubular connection.

5. The combination with a flexible shaft, of a fixed stuffing-box section surrounding and engaging a portion of said shaft, another stuffing-box section surrounding and engaging a different portion of the shaft, said second section being movable to follow the shaft in its lateral deviations, and an imperforate tubular flexible connection extending from one stuffing-box section to the other, so as to surround and inclose the portion of the shaft which is between the two stuffing-box sections.

In witness whereof I have hereunto signed my name, this 29th day of March, 1902, in presence of two subscribing witnesses.

ALFRED SCHÜTT.

Witnesses:
HENRY HASPER,
WOLDEMAR HAUPT.